(12) United States Patent
Shi et al.

(10) Patent No.: US 9,302,431 B2
(45) Date of Patent: Apr. 5, 2016

(54) RAPID PROTOTYPING APPARATUS FOR PRODUCING THREE-DIMENSIONAL CERAMIC OBJECT

(71) Applicant: MICROJET TECHNOLOGY CO., LTD, Hsinchu (TW)

(72) Inventors: Kwo-Yuan Shi, Hsinchu (TW); Ke-Ming Huang, Hsinchu (TW)

(73) Assignee: MICROJET TECHNOLOGY CO., LTD, Hsinchu (TW)

( * ) Notice: Subject to any disclaimer, the term of this patent is extended or adjusted under 35 U.S.C. 154(b) by 0 days.

(21) Appl. No.: 14/608,592

(22) Filed: Jan. 29, 2015

(65) Prior Publication Data

US 2015/0231832 A1    Aug. 20, 2015

(30) Foreign Application Priority Data

Feb. 20, 2014    (TW) .............................. 103105677 A

(51) Int. Cl.
| | |
|---|---|
| *B29C 67/00* | (2006.01) |
| *B33Y 30/00* | (2015.01) |
| *B28B 1/00* | (2006.01) |
| *B29L 9/00* | (2006.01) |

(52) U.S. Cl.
CPC ............. *B29C 67/0096* (2013.01); *B28B 1/001* (2013.01); *B29C 67/0085* (2013.01); *B33Y 30/00* (2014.12); *B29L 2009/00* (2013.01)

(58) Field of Classification Search
None
See application file for complete search history.

(56) References Cited

U.S. PATENT DOCUMENTS

| | | | |
|---|---|---|---|
| 2013/0141491 A1* | 6/2013 | Krichtman et al. ............. | 347/30 |
| 2014/0162016 A1* | 6/2014 | Matsui et al. .................. | 428/76 |
| 2014/0292968 A1* | 10/2014 | Hayashi et al. ............... | 347/102 |

* cited by examiner

*Primary Examiner* — Jacob Thomas Minskey
(74) *Attorney, Agent, or Firm* — Kirton McConkie; Evan R. Witt

(57) ABSTRACT

A rapid prototyping apparatus includes a construction platform, a movable platform, a printing module, a cleaning and maintenance module, a construction material spreading element, a heater and a heat shield. A construction chamber is formed in the construction platform. The movable platform and the construction platform are movable relative to each other. The printing module is installed on the movable platform, and includes at least one printhead unit. The cleaning and maintenance module is installed on the movable platform. The construction material spreading element is installed on the movable platform for spreading a ceramic construction material to the construction chamber. After the ceramic construction material is spread in the construction chamber, the construction material is heated by the heater. After the printhead unit performs a printing operation, the printhead unit is cleaned and maintained by the cleaning and maintenance module.

4 Claims, 6 Drawing Sheets

RAPID PROTOTYPING APPARATUS FOR PRODUCING THREE-DIMENSIONAL CERAMIC OBJECT

FIELD OF THE INVENTION

The present invention relates to a rapid prototyping apparatus, and more particularly to a rapid prototyping apparatus for producing a three-dimensional ceramic object.

BACKGROUND OF THE INVENTION

Generally, ceramic objects are produced by a series of complicated steps, including a step of forming pottery slurry, a step of molding clay, an air drying step and a high temperature sintering step. As known, these steps are labor-intensive and time-consuming. Moreover, since these steps are manually performed and controlled, some drawbacks may occur. For example, since the step of forming pottery slurry is manually done, the quality of the raw material cannot be uniformly controlled. In other words, the finished ceramic objects may have inconsistent quality. After the step of forming pottery slurry, the step of molding clay is performed. During the step of molding clay, the extents of fineness of the finished ceramic objects are varied depending on the experiences, the hand feels and the aesthetic perceptions of different operators. Even if different ceramic objects are produced by the same operator, these ceramic objects are somewhat different in quality. That is, since the steps of producing the ceramic objects are labor-intensive and time-consuming and the finished ceramic objects have inconsistent quality, the ceramic objects are expensive in prices and difficult to meet the consumers' preferences. Therefore, it is an important issue to develop a method of automatically producing cost-effective ceramic objects with stable quality.

As kwon, a rapid prototyping (RP) technology is developed from the concepts of forming a pyramid by stacking layers, and the main technical feature is to achieve fast formation. A complicated design can be transformed into a three-dimensional physical model automatically and fast without any cutting tools, molds and fixtures. Thus, the development cycle of new products and research and development cost are largely reduced to ensure the time to market for new products and the first-time-right ratio. Accordingly, a complete and convenient product design tool is provided between technicians and non-technicians (e.g. managers and users), and the product competitiveness and the quick reaction capability of enterprises in the market are improved obviously.

Recently, the rapid prototyping technology develops a method for producing three-dimensional physical models by combining an inkjet printing technology and a precise positioning technology of positioning the carriers. The producing method begins by first spreading a layer of powder on the carrier and then printing high viscosity liquid binder on part of the powder by using the inkjet printing technology, so that the liquid binder and the powder stick together to become solidified. After the above steps are repeatedly done, a three-dimensional physical model is produced by stacking multiple layers. However, the development of the rapid prototyping technology is limited by the molding powder material and the binder material corresponding to the molding powder material. That is, the researchers do not pay much attention to the applications of other materials.

FIG. 1 is a schematic perspective view illustrating a conventional rapid prototyping apparatus. As shown in FIG. 1, the rapid prototyping apparatus 1 comprises a printing module 10, a movable platform 11 and a construction platform 12. The printing module 10 is installed on the movable platform 11. Moreover, the printing module 10 may be moved with the movable platform 11 to a position over the construction platform 12. Moreover, a construction material supply container 13 and a construction chamber 14 are installed on the construction platform 12. The construction material supply container 13 is used for temporarily storing a construction material. When the movable platform 11 is moved to the construction material supply container 13, the construction material is pushed to the nearby construction chamber 14. Consequently, a construction layer to be printed is formed. Then, the printing module 10 performs a printing operation on the construction layer. After the above steps are repeatedly done, a three-dimensional object (not shown) is produced by stacking multiple layers.

The conventional rapid prototyping apparatus 1 further comprises a cleaning and maintenance module 15. The cleaning and maintenance module 15 comprises a moisturizing unit 151 and a blade unit 152. As shown in FIG. 1, the cleaning and maintenance module 15 is fixedly disposed on the construction platform 12 and beside the construction chamber 14. After the printing module 10 finishes the printing operation, the printing module 10 is moved with the movable platform 11 to the position over the cleaning and maintenance module 15. Consequently, the cleaning and maintenance module 15 can perform a cleaning and maintenance operation on the printing module 10. In particular, the cleaning and maintenance module 15 is located at a lateral side of the construction platform 12 of the conventional rapid prototyping apparatus 1. Consequently, after the printing operation is completed and the printing module 10 is moved across the entire of the length of the construction platform 12, the cleaning and maintenance module 15 can perform a cleaning and maintenance operation on the printing module 10. Under this circumstance, the performance of cleaning and maintaining the printhead structure is deteriorated.

As mentioned above, the development of the rapid prototyping technology is limited by the construction material, and the cleaning and the maintenance operation on the printing module is important to the quality of the finished product.

Therefore, there is a need of providing a rapid prototyping apparatus for producing a three-dimensional ceramic object with good quality in order to overcome the above drawbacks.

SUMMARY OF THE INVENTION

An object of the present invention provides a rapid prototyping apparatus for producing a three-dimensional ceramic object with good quality at a faster speed and lower labor cost.

Another object of the present invention provides a rapid prototyping apparatus capable of automatically producing a three-dimensional ceramic object. Moreover, the ceramic object produced by the rapid prototyping apparatus can be personalized or popularized according to the practical requirements. In addition, the quality of the ceramic object is more delicate and consistent.

In accordance with an aspect of the present invention, there is provided a rapid prototyping apparatus for producing a three-dimensional ceramic object. The rapid prototyping apparatus includes a construction platform, a movable platform, a printing module, a cleaning and maintenance module, a construction material spreading element, a heater and a heat shield. A construction chamber is formed in the construction platform. The movable platform is disposed above the construction platform. The movable platform and the construction platform are movable relative to each other. The printing module is installed on the movable platform, and includes at least one printhead unit. The printing module is synchronously moved with the movable platform. The cleaning and maintenance module is installed on the movable platform. The cleaning and maintenance module is synchronously moved with the movable platform. The construction material spreading element is installed on the movable platform for spreading a ceramic construction material to the construction chamber. The heater is disposed over the construction platform. After the ceramic construction material is spread in the construction chamber, the construction material is heated by the heater. The heat shield is disposed over the at least one printhead unit for shielding the at least one printhead unit. After the at least one printhead unit performs a printing operation, the at least one printhead unit is cleaned and maintained by the cleaning and maintenance module.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
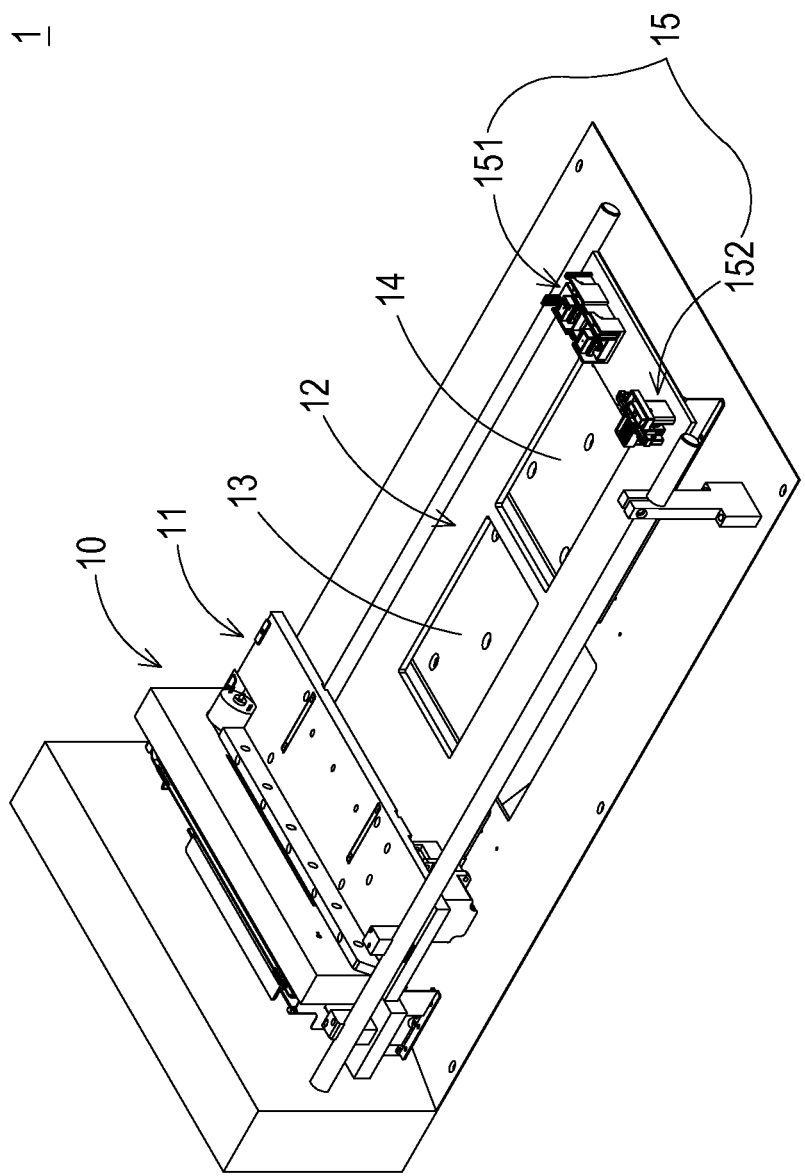
FIG. 1 is a schematic perspective view illustrating a conventional rapid prototyping apparatus.
Figure 2A:
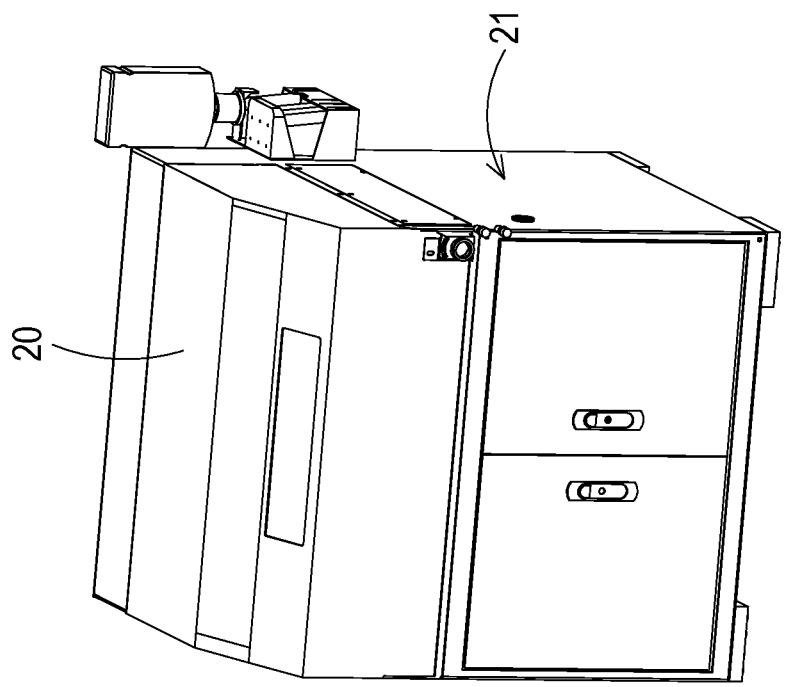
FIG. 2A is a schematic perspective view illustrating the outer appearance of a rapid prototyping apparatus for producing a three-dimensional ceramic object according to an embodiment of the present invention.
Figure 2B:
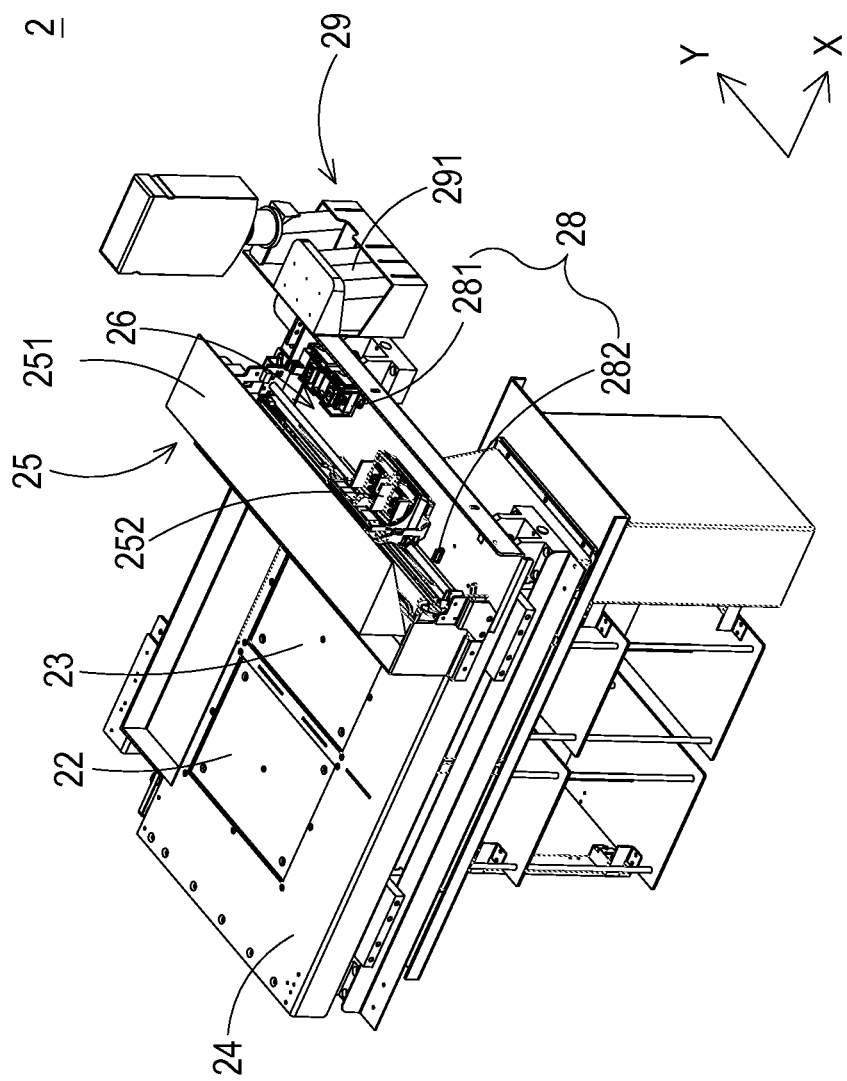
FIG. 2B is a schematic perspective view illustrating the inner structure of the rapid prototyping apparatus of FIG. 2A.

FIG. 2A is a schematic perspective view illustrating the outer appearance of a rapid prototyping apparatus for producing a three-dimensional ceramic object according to an embodiment of the present invention. FIG. 2B is a schematic perspective view illustrating the inner structure of the rapid prototyping apparatus of FIG. 2A.

As shown in FIG. 2A, the rapid prototyping apparatus 2 comprises an upper cover 20 and a main body 21. The main body 21 is covered by the upper cover 20. Consequently, a sealed space (not shown) is defined within the upper cover 20. Since the rapid prototyping operation is performed within the sealed space, the powder is prevented from flying to the outside of the upper cover 20. As shown in FIG. 2B, the rapid prototyping apparatus 2 comprises a construction material supply container 22, a construction chamber 23, a construction platform 24, a printing module 25, a movable platform 26, a cleaning and maintenance module 28 and a continuous liquid supply unit 29. The printing module 25 and the cleaning and maintenance module 28 are installed on the movable platform 26. Consequently, the printing module 25 and the cleaning and maintenance module 28 are synchronously moved with the movable platform 26. In this embodiment, the printing module 25 and the cleaning and maintenance module 28 may be moved with the movable platform 26 to the position over the construction platform 24. Alternatively, the construction platform 24 may be moved relative to the movable platform 26. Alternatively, the construction platform 24 and the movable platform 26 may be moved relative to each other. That is, the relative movement of the construction platform 24 and the movable platform 26 may be varied according to the practical requirements. When the movable platform 26 is driven by a moving mechanism 261 (see FIG. 3), the movable platform 21 is horizontally moved relative to the construction platform 24 along an X-axis. The construction material supply container 22 and the construction chamber 23 are installed in the construction platform 24. The construction material supply container 23 is used for temporarily storing a ceramic construction material. When the movable platform 26 is moved to the construction material supply container 22, the ceramic construction material is spread to the nearby construction chamber 23. Consequently, a construction layer to be printed is formed. Then, the printing module 25 performs a printing operation on the ceramic construction material. After the above steps are repeatedly done, a three-dimensional ceramic object (not shown) is produced by stacking multiple layers. The continuous liquid supply unit 29 is located at a first side of the construction platform 24. Moreover, the continuous liquid supply unit 29 comprises plural monochromatic liquid containers 291 for storing monochromatic print liquids. The plural monochromatic liquid containers 291 are in communication with the plural printhead units 252 of the printing module 25 through plural external pipes (not shown), respectively. Through the external pipes, the print liquids (e.g. liquid binders or the color inks) for performing the printing operation are continuously supplied or replenished.

In this embodiment, the printing module 25 comprises at least one printhead unit 252 and a heat shield 251. The heat shield 251 is disposed over the at least one printhead unit 252. It is noted that the location of the heat shield 251 is not restricted. The cleaning and maintenance module 28 comprises a moisturizing unit 281 and a blade unit 282. More especially, as shown in FIG. 2B, the cleaning and maintenance module 28 is synchronously moved with the at least one printhead unit 252 along the X-axis. While the printing operation is performed, the at least one printhead unit 252 is moved along a Y-axis in a reciprocating manner and also moved with the cleaning and maintenance module 28 along the X-axis. Whenever the at least one printhead unit 252 is moved along the Y-axis in a reciprocating manner and returned to an initial position corresponding to the blade unit 282, the nozzles of the at least one printhead unit 252 are cleaned by the blade unit 282. Consequently, the printing quality is enhanced. In this embodiment, the moisturizing unit 281 and the blade unit 282 are located at two opposite sides of the movable platform 26. The moisturizing unit 281 is used for completely closing the nozzles (not shown) of the at least one printhead unit 252 in order to achieve a moisturizing function. Generally, while the rapid prototyping apparatus 2 spreads the ceramic construction material, the amount of the flying powder is relatively larger. For preventing the flying powder from polluting the at least one printhead unit 252, the at least one printhead unit 252 is moved to the position corresponding to the moisturizing unit 281 during the process of spreading the ceramic construction material. Consequently, the printing quality of the at least one printhead unit 252 is not adversely affected.

Figure 2C:
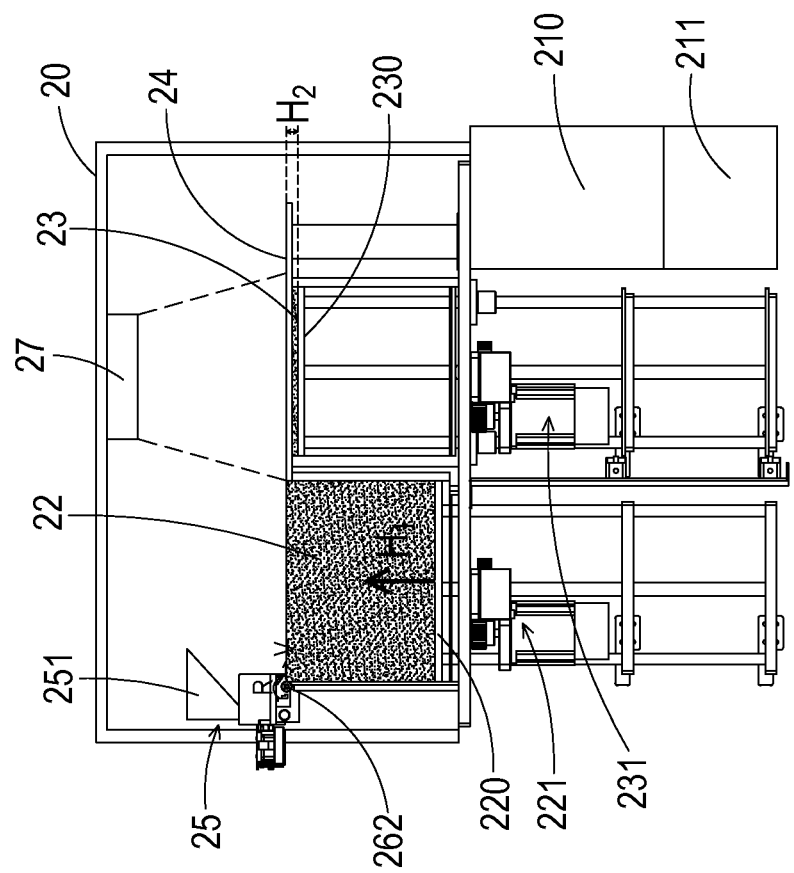
FIG. 2C is a schematic cross-sectional view illustrating the rapid prototyping apparatus of FIG. 2B.

FIG. 2C is a schematic cross-sectional view illustrating the rapid prototyping apparatus of FIG. 2B. The construction chamber 23 is concavely formed in the construction platform 24 of the rapid prototyping apparatus 2. Moreover, the construction material supply container 22 is a fill space beside the construction chamber 23. As mentioned above, the construction material supply container 22 is used for temporarily storing the ceramic construction material (e.g. the ceramic construction powder). Moreover, a first lift/lower platform 220 is disposed within the construction material supply container 22. In addition, a first lift/lower mechanism 221 is disposed under the construction material supply container 22 for moving the first lift/lower platform 220 along a vertical direction. As shown in FIG. 2C, the first lift/lower platform 220 is moved upwardly for a distance H1. Consequently, a specified amount of the ceramic construction material may be guided to the topmost layer. Since the construction material supply container 22 is embedded in the construction platform 24, the construction material supply container 22 is an underfeed container. Similarly, a second lift/lower platform 230 is disposed within the construction chamber 23. A three-dimensional ceramic object produced by stacking multiple construction layers may be placed on the second lift/lower platform 230. In addition, a second lift/lower mechanism 231 is disposed under the construction chamber 23 and connected with the second lift/lower platform 230. The second lift/lower mechanism 231 is used for moving the second lift/lower platform 230 within the construction chamber 23 along the vertical direction. Consequently, a spreading space is defined between the construction chamber 23 and the construction platform 24. As shown in FIG. 2C, the second lift/lower platform 230 is moved downwardly for a distance H2. Then, the desired amount of the ceramic construction material is spread into the spreading space to form the construction layer. Then, the printing module 25 performs the printing operation on the ceramic construction material. After the above steps are repeatedly done, the three-dimensional ceramic object is produced by stacking multiple layers. In an embodiment, the upwardly-moved distance H1 of the first lift/lower platform 220 is larger than or equal to the downwardly-moved distance H2 of the second lift/lower platform 230. In a preferred embodiment, the downwardly-moved distance H2 is in the range between 0 mm and 12 mm.

Moreover, a recycling tank 210 is located at the second side of the construction chamber 23. After the ceramic construction material is spread on the topmost layer within the construction chamber 23, the excess ceramic construction material is collected by the recycling tank 210. A sieving box 211 is located below the recycling tank 210 and in communication with the recycling tank 210. The collected ceramic construction material from the recycling tank 210 is sieved by the sieving box 211. Consequently, the ceramic construction material can be recycled for reuse.

Figure 3:
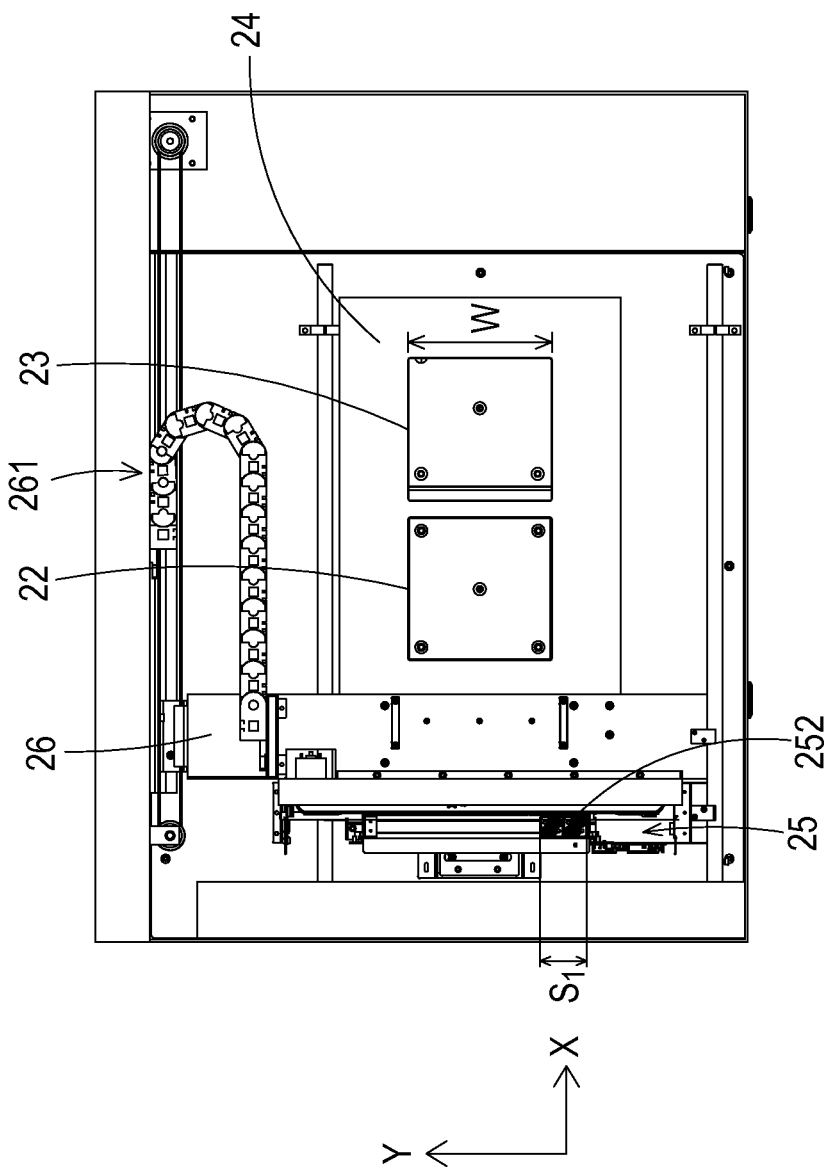
FIG. 3 is a schematic top view illustrating the rapid prototyping apparatus of FIG. 2B.

FIG. 3 is a schematic top view illustrating the rapid prototyping apparatus of FIG. 2B. Please refer to FIGS. 2B, 2C and 3. While the printing operation of the rapid prototyping apparatus 2 is performed, the moving mechanism 261 is enabled to drive horizontal movement of the movable platform 26 relative to the construction platform 24 along the X-axis. Especially, while the horizontal movement of the movable platform 26 is driven by the moving mechanism 261, the ceramic construction material at the topmost layer of the construction material supply container 22 and moved by the first lift/lower platform 220 is horizontally pushed to the spreading space of the construction chamber 23 by a construction material spreading element 262, which is installed on the movable platform 26. Then, the printing module 25 linked with the movable platform 26 performs the printing operation to eject the print liquids to the ceramic construction material within the construction chamber 23. In addition, the excess ceramic construction material is further pushed to the recycling tank 210 by the construction material spreading element 262. Consequently, the excess ceramic construction material is collected by the recycling tank 210 and further recycled.

In an embodiment, the construction material spreading element 262 includes but is not limited to a roller. The rotating speed of the roller is determined according to the formulation of the ceramic construction material. For example, if the rotating speed is faster, the spread ceramic construction material is denser and the structure of the produced ceramic object is stronger. Whereas, if the rotating speed is slower, the spread ceramic construction material is sparser and the structure of the produced ceramic object is looser. If the density of the spread ceramic construction material is lower than a specified value, the three-dimensional ceramic object may fail to be successfully formed. In an embodiment, the relationship between the rotating speed $V_R$ of the roller (i.e. the construction material spreading element 262) and the linear speed $V_L$ of the roller may be expressed as: $V_R \leq N*V_L$, wherein N is a positive integer. If N is larger, it means that the rotating number of the roller is larger during the linear movement of the roller and the number of contacting the roller with the spread ceramic construction layer is increased. In other words, if N is larger, the spread ceramic construction material is denser and the ceramic construction layer is smoother. It is noted that the rotating speed of the roller may be varied according to the type of the ceramic construction material or according to the practical requirements.

Please refer to FIGS. 2B and 2C again. For shortening the solidifying time, the rapid prototyping apparatus 2 is further equipped with a heater 27. The heater 27 is disposed on the upper cover 20 and located over the construction chamber 23. After the printing module 25 performs the printing operation, the three-dimensional ceramic object within the construction chamber 23 is heated by the heater 27, so that the drying rate is increased. As known, if the amount of the print liquid ejected from the printing module 25 is excessive, the print liquid flows externally because of the capillary action, and the edges of the stacked construction layers are possibly warped or blurred. Since the three-dimensional ceramic object within the construction chamber 23 is heated by the heater 27, the possibility of generating the warped or blurred will be minimized. Moreover, for preventing the heater 27 from heating the at least one printhead unit 252 of the printing module 25, the printing module 25 further comprises the heat shield 251. The heat shield 251 is disposed over the at least one printhead unit 252 and synchronously moved with the printhead unit 252. While the movable platform 26 is moved relative to the construction platform 24 and thus the printing module 25 is moved to the position under the heater 27, the at least one printhead unit 252 is protected by the heat shield 251. That is, by means of the heat shield 251, the at least one printhead unit 252 of the printing module 25 is not heated by the heater 27. Under this circumstance, the at least one printhead unit 252 is not damaged because of high temperature.

Figure 4:
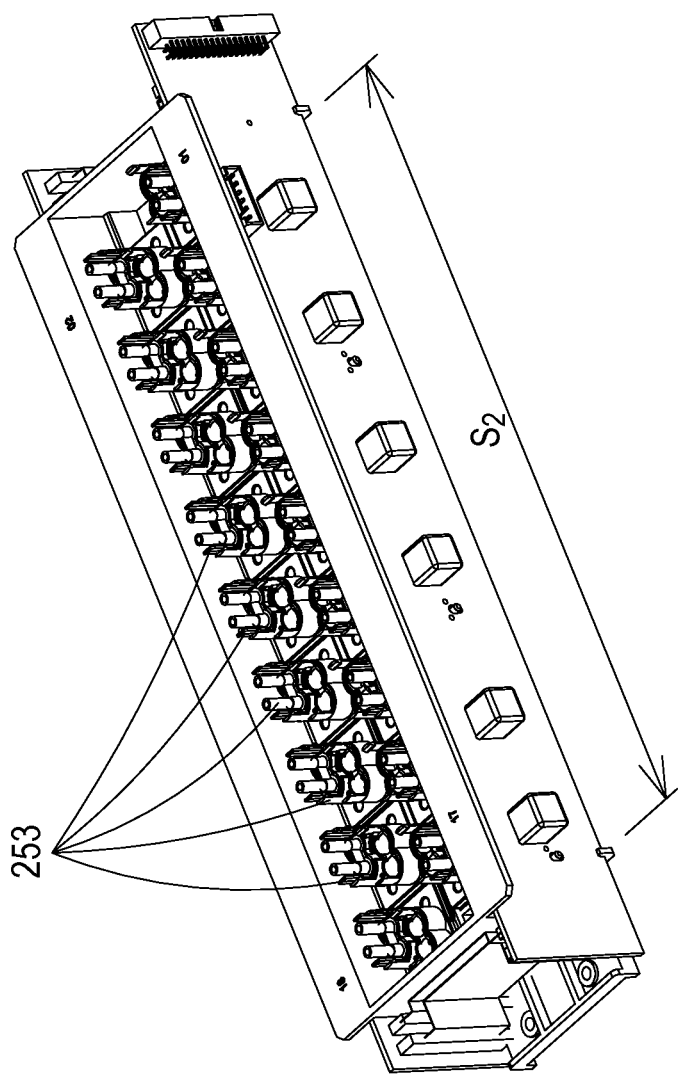
FIG. 4 is a schematic perspective view illustrating a page-width array printing module used in the rapid prototyping apparatus of the present invention.

In the embodiment of FIG. 3, the printing module 25 comprises two printhead units 252. The overall length S1 of the two printhead units 252 is smaller than the width W of the construction chamber 23. While the printing operation is performed, the printing module 25 is moved along the Y-axis in a reciprocating manner and then moved along the X-axis. That is, the printing module 25 is moved along the X-axis and the Y-axis to perform the printing operation. It is noted that numerous modifications and alterations may be made while retaining the teachings of the invention. For example, in some other embodiments, the printing module 25 is page-width array printing module. FIG. 4 is a schematic perspective view illustrating a page-width array printing module used in the rapid prototyping apparatus of the present invention. As shown in FIG. 4, the page-width array printing module 25 comprises plural printhead units 253. The overall length S2 of the plural printhead units 253 is larger than the width W of the construction chamber 23. Consequently, for performing the printing operation to eject the print liquids to the ceramic construction material within the construction chamber 23, the page-width array printing module 25 only needs to be moved along a single axis (i.e. the X-direction). That is, it is not necessary to move the page-width array printing module 25 along the Y-axis. Consequently, the printing speed and the printing efficiency are both enhanced. It is noted that the numbers of the printhead units 252 and 253 are not restricted.

From the above descriptions, the present invention provides the rapid prototyping apparatus for producing a three-dimensional ceramic object. The printing module is moved relative to the construction platform (and its construction chamber) for performing the printing operation within the construction chamber. The rotating speed of the roller (i.e. the construction material spreading element) is determined according to the formulation of the ceramic construction material. By properly adjusting the rotating speed of the roller, the smoothness of the spread ceramic construction material is enhanced. Moreover, the general printing module or the page-width array printing module may be selectively used according to the practical requirements. Consequently, the speed and efficiency of forming the three-dimensional ceramic object is increased. Moreover, whenever the printhead unit is moved along the Y-axis in a reciprocating manner and returned to the initial position, the printhead unit is cleaned by the cleaning and maintenance module, which is linked with the movable platform. Consequently, the printing quality is enhanced. In other words, the rapid prototyping apparatus is capable of producing the three-dimensional ceramic object with good quality at a faster speed. As previously described, the conventional method of fabricating the ceramic object is labor-intensive and time-consuming because the fabricating steps are manually performed and controlled. By using the rapid prototyping apparatus of the present invention, the delicate three-dimensional ceramic object can be produced automatically according to a 3D image file. Since the produced ceramic objects can meet the consumers' preferences, the produced ceramic objects are personalized. Moreover, diverse and popular ceramic objects may be made to meet the requirements of the market. Moreover, since the fabricating steps are automatically performed and controlled, the finished ceramic objects may have consistent quality and identical shapes. When compared with the conventional ceramic objects and the conventional fabricating method, the ceramic objects produced by the rapid prototyping apparatus are personalized and popularized.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A rapid prototyping apparatus for producing a three-dimensional ceramic object, the rapid prototyping apparatus comprising:
    a construction platform, wherein a construction chamber is formed in the construction platform;
    a movable platform disposed above the construction platform, wherein the movable platform and the construction platform are movable relative to each other;
    a printing module installed on the movable platform, and comprising at least one printhead unit, wherein the printing module is synchronously moved with the movable platform;
    a cleaning and maintenance module installed on the movable platform, wherein the cleaning and maintenance module is synchronously moved with the movable platform;
    a construction material spreading element installed on the movable platform for spreading a ceramic construction material to the construction chamber;
    a heater disposed over the construction platform, wherein after the ceramic construction material is spread in the construction chamber, the construction material is heated by the heater; and
    a heat shield disposed over the at least one printhead unit for shielding the at least one printhead unit,
    wherein after the at least one printhead unit performs a printing operation, the at least one printhead unit is cleaned and maintained by the cleaning and maintenance module.

2. The rapid prototyping apparatus according to claim 1, wherein the cleaning and maintenance module comprises:
    a moisturizing unit for closing and moisturizing nozzles of the at least one printhead unit; and
    a blade unit for cleaning the nozzles of the at least one printhead unit.

3. The rapid prototyping apparatus according to claim 1, wherein the construction material spreading element is a roller, wherein a relationship between a rotating speed $V_R$ of the roller and a linear speed $V_L$ of the roller is expressed as: $V_R \leq N*V_L$, wherein N is a positive integer.

4. The rapid prototyping apparatus according to claim 1, wherein a lift/lower platform is disposed within the construction chamber for lifting or lowering the construction chamber, wherein while the printing operation is performed within the construction chamber, the lift/lower platform is moved downwardly for a specified distance, so that a spreading space is defined between the construction chamber and the construction platform, wherein the specified distance is in a range between 0 mm and 12 mm.

* * * * *